April 24, 1928.
G. W. BOWMAN
NUT LOCK
Filed July 16, 1927
1,667,305
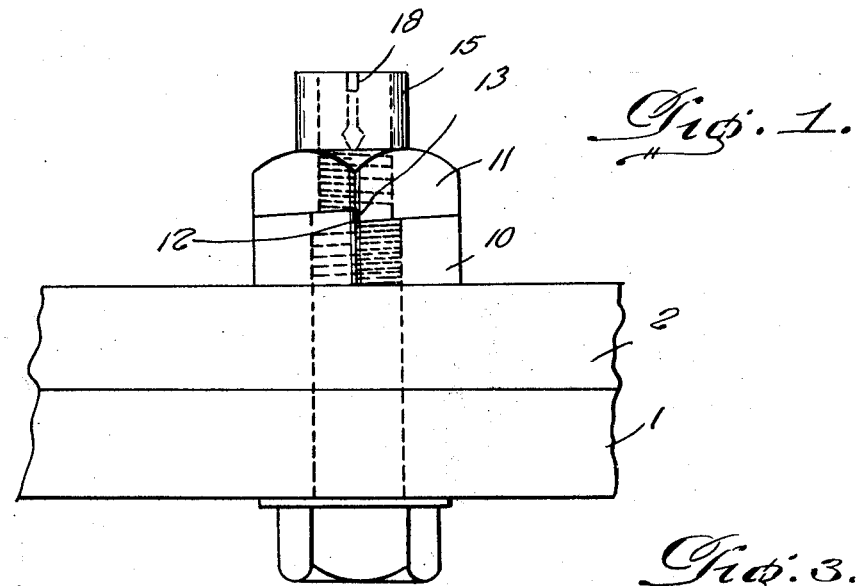
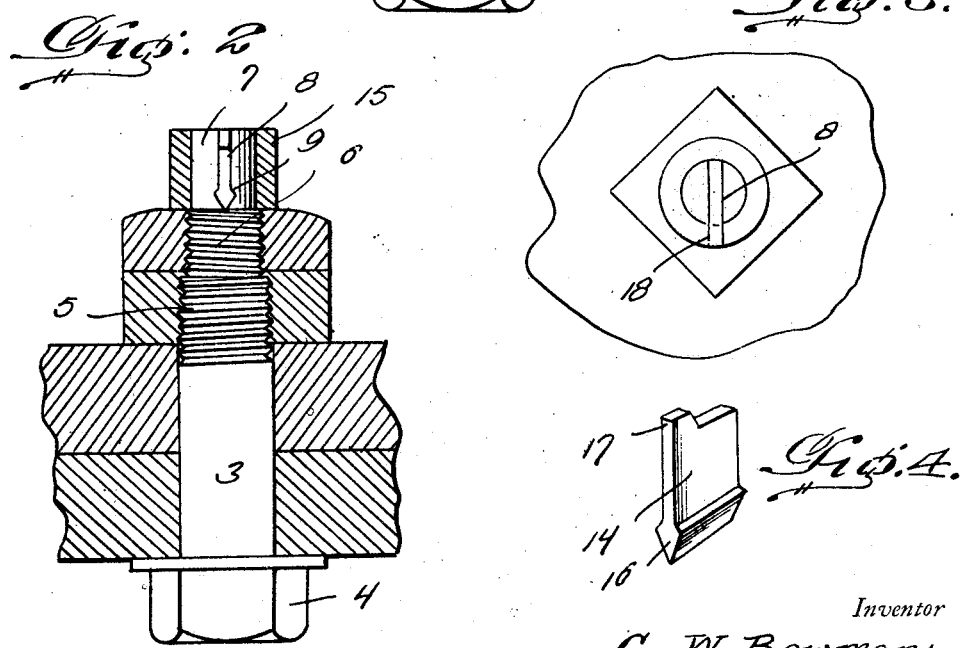
Inventor
G. W. Bowman,
By Clarence A. O'Brien
Attorney Patented Apr. 24, 1928.

1,667,305

UNITED STATES PATENT OFFICE.

GEORGE W. BOWMAN, OF SEYMOUR, TEXAS.

NUT LOCK.

Application filed July 16, 1927. Serial No. 206,275.

My present invention pertains to nut locks; and it contemplates the provision of a simple and easily applied nut lock, and one which is highly efficient in preventing the casual displacement of a nut or nuts.

To the attainment of the foregoing, the invention consists in the improvement as hereinafter described and definitely claimed.

In the acompanying drawings accompanying and forming part of this specification:—

Figure 1 is an elevation illustrating the preferred embodiment of my invention.

Figure 2 is a sectional view of the improvement with the bolt and the key in elevation.

Figure 3 is an end elevation of the improvement.

Figure 4 is an enlarged perspective of the key per se.

Similar numerals of reference designate corresponding parts in all of the views of the drawing.

I show in Figures 1 and 2 two elements 1 and 2 to be connected, and I also show in said figures a bolt 3 which in the illustrated embodiment of the invention has a head 4, a right hand threaded portion 5, a left hand threaded portion 6, and a plain or smooth cylindrical terminal portion 7. The said terminal portion 7 is provided with a diametrical kerf 8 which extends to the bolt ends and terminates at its inner end in an enlargement 9, preferably, though not necessarily of the cross sectional shape illustrated.

I also show in Figures 1 and 2 and at the opposite side of the elements 1 and 2, with reference to the bolt head 4, a nut 10 complementary to the threaded portion 5, and a nut 11 complementary to the threaded portion 6. These nuts 10 and 11 are shown as having cooperating abutments 12 and 13 on their confronting faces so that when the nut 10 is turned outwardly, the nuts will be coupled together as appears in Figure 1.

For cooperation with the bolt 3 in preventing outward movement of a nut on the bolt I provide a key 14, and an annulus 15. The key 14 is headed at 16 and is otherwise shaped to be introduced edgewise laterally into the kerf 8 of the bolt; and it will also be noted that the key 14 is provided at its outer end adjacent to one of its edges with a projection 17. The annulus 15 is provided in its outer edge with a notch 18 designed to receive the said projection 17 when the projection is hammered down flush with the outer ends of the bolts and annulus.

In the practical use of my improvement, the key 14 is inserted edgewise in the kerf of the bolt 3, and the annulus 15 is moved endwise into position on the bolt end and about said end and the key 14 therein. In the said position, the inner end of the annulus 15 is opposed to the outer side of the nut 11, and after the annulus 15 is positioned as indicated, the projection 17 of the key 14 is subjected to hammer blows until said projection is seated in the notch 18 of the annulus, whereupon the annulus will be strongly secured on the bolt and will serve to effectively preclude outward movement of the nut 11 on the bolt.

It will be apparent from the foregoing that my improvement is susceptible of quick and easy application, and that it is capable of precluding outward movement of the nut 11 even when said nut 11 is subjected to great stresses.

I have entered into a detailed description of the construction and relative arrangement of the parts embraced in the present and preferred embodiment of my invention in order to impart a full, clear, and exact understanding of the said embodiment. I do not desire, however, to be understood as limiting myself to the construction illustrated, my invention being defined by my appended claims within the scope of which modifications may be made without departure from my invention.

Having thus described the invention, what I claim as new and desire to secure by Letters Patent is:—

1. The combination in a nut lock, of a bolt having a threaded portion and a terminal portion, the latter with a diametrical kerf extending to its end and enlarged at the inner end of the kerf, a nut on the threaded portion of the bolt, a key disposed in the kerf of the bolt and having an enlargement or head at its inner end and also having a projection at its outer end, and an annulus receiving the terminal portion of the bolt and the key and opposed to the outer side of the nut and having a notch receiving or seating the said projection of the key.

2. The combination in a nut lock, of a bolt having an end portion with a diametrical kerf therein and an enlargement at the inner end of the kerf, an annulus about said end portion of the bolt, and a key secured in the bolt kerf and having a portion engaging and adapted to prevent displacement of the annulus.

In testimony whereof I affix my signature.

GEORGE W. BOWMAN.